United States Patent [19]

Jardine

[11] 4,008,709

[45] Feb. 22, 1977

[54] UNDERGROUND STORAGE SYSTEM FOR HEATING AND COOLING SYSTEMS

[76] Inventor: Douglas M. Jardine, 4705 Brady Place, Colorado Springs, Colo. 80915

[22] Filed: Mar. 17, 1975

[21] Appl. No.: 558,672

[52] U.S. Cl. .............................. 126/271; 126/400; 165/45; 237/1 A

[51] Int. Cl.² ......................................... F24J 3/02

[58] Field of Search .......... 126/400, 271; 237/1 A; 62/2, 434; 237/59; 165/45, 106

[56] References Cited

UNITED STATES PATENTS

| | | | |
|---|---|---|---|
| 1,835,400 | 12/1931 | Ingison et al. | 165/106 X |
| 1,865,513 | 8/1958 | Gaugler | 62/434 X |
| 1,891,713 | 10/1958 | Jordan et al. | 62/434 X |
| 2,529,154 | 11/1950 | Hammond et al. | 62/2 X |
| 2,563,935 | 8/1951 | Huffman et al. | 62/434 X |
| 3,236,294 | 6/1960 | Thomason | 126/400 X |
| 3,295,591 | 1/1967 | Thomason | 126/400 X |
| 3,812,903 | 11/1965 | Thomason | 126/400 X |

*Primary Examiner*—William E. Wayner
*Assistant Examiner*—William E. Tapolcai, Jr.
*Attorney, Agent, or Firm*—Fulwider, Patton, Rieber, Lee & Utecht

[57] ABSTRACT

A thermal energy storage system including a thermal energy storage tank and a pair of thermal energy exchange tanks disposed in a different horizontal plane than the thermal energy storage tank. Each of the tanks contain a heat exchange medium and are in fluid communication with each other for circulation of the heat exchange medium between the exchange tanks and the storage tanks by convection. The exchange tanks contain a heat exchange coil which is in fluid communication with a first heat exchanger for heating or cooling the medium in the exchange tank. The storage tank is in fluid communication with a second heat exchanger for the transfer of the heat exchange medium therebetween to heat or cool a structure. The system is disposed beneath the ground adjacent the structure being heated or cooled and an envelope of noncoherent material is disposed about the system to provide a corrosion resistant barrier between the tanks, and the adjacent earth and to act as a conduit for the transfer of thermal energy between the system and the surrounding earth.

18 Claims, 8 Drawing Figures

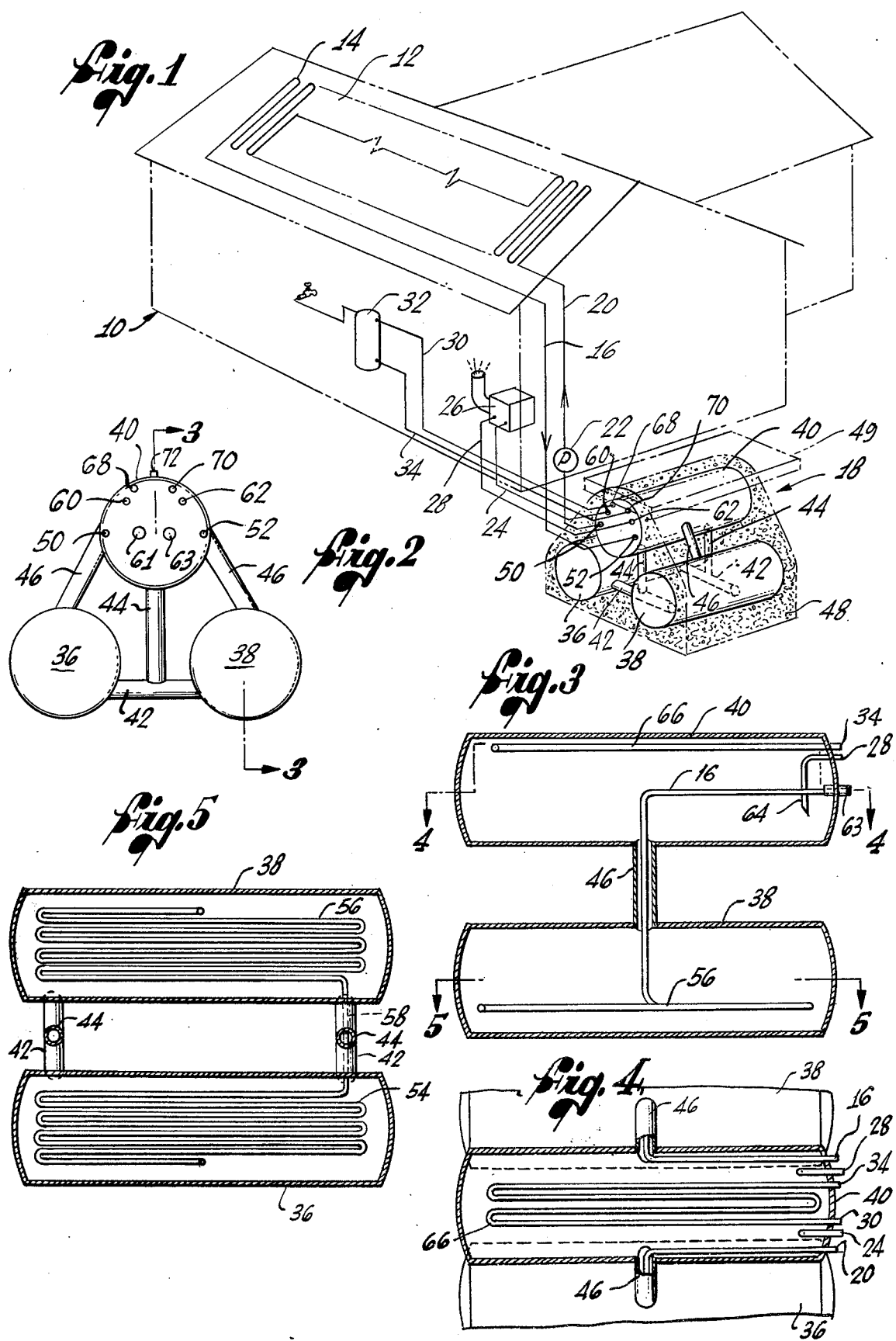

UNDERGROUND STORAGE SYSTEM FOR HEATING AND COOLING SYSTEMS

BACKGROUND OF THE INVENTION

This invention relates to heating and cooling systems and more particularly to an improved system for the utilization of natural thermal energy sources for heating and cooling structures and the like.

A variety of systems utilizing solar energy as a source of thermal energy have been developed for various purposes and with the increasing emphasis on the conservation of hydrocarbon fuels, solar heating systems are becoming increasingly attractive for use in the space heating of structures. Likewise, cooling systems involving the atmospheric radiation of heat energy for cooling fluids are known, although when utilized for structural cooling, the systems normally are employed with a heat pump which requires additional energy input for operation. Because of the intermittent nature of solar heating and atmospheric radiation to effect heating and cooling, an effective thermal energy storage system is required for the containment of thermal energy as conditions permit.

Most thermal energy storage systems, particularly where solar derived thermal energy is concerned, involve the storage of sensible heat in large tanks of water or in rock bins. However, with such systems, the storage capacity is limited by the volume of the storage system. Extremely large storage capacities are generally not economical.

Attempts to utilize the earth as a storage medium for thermal energy have been made but have proved deficient for several reasons. For example large reservoirs for containing hot water and the like are impractical for most installations due to the high cost of preparing the reservoir.

Likewise, systems involving burying lines in the earth through which a heat exchange fluid is circulated have generally proved to be impractical because of the large number of lines required in order to effect the exchange of a practical quantity of heat energy for use in even a small structure such as a single family residence. Another important deficiency in such systems is the formation of an air film around the buried lines which results from compaction of the earth immediately surrounding the line due to the expansion and contraction of the line as the heat exchanger fluid loses thermal energy to the earth. The air film in effect insulates the line and severely inhibits the efficient exchange of thermal energy. Corrosion of the lines is another serious deficiency in such systems.

The present invention overcomes the foregoing deficiencies in underground thermal energy storage systems and provides a highly efficient and economical system for the storage of thermal energy in heating and cooling systems.

SUMMARY OF THE INVENTION

The present invention resides in a thermal energy storage system particularly adapted for use in combination with structural space heating and cooling systems. The system is disposed underground adjacent the structure or structures to be serviced and includes a plurality of containers in which is contained a heat exchange medium. An envelope of non-coherent particulate material surrounds the containers and acts to prevent the formation of air films between the earth and the containers, and additionally provides for the effective transmission of thermal energy therebetween. In this manner, the earth acts as a storage area for thermal energy, which is retrieved when needed for heating the heat exchange medium and for receiving thermal energy from the heat exchange medium to cool the heat exchange medium, depending upon the mode of operation. The system is provided with heat exchange means in communication with a first external heat exchanger for gaining or losing thermal energy and with a second heat exchanger for imparting or removing thermal energy from a structure.

Preferably, the system comprises at least one fluid storage tank and at least one exchanger tank disposed in different horizontal planes with respect to one another and the tanks are in fluid communication with each other. When in the heating mode, the exchanger tank is disposed in a horizontal plane below that of the fluid storage tank. The exchange tank contains heat exchange means in communication with the first heat exchanger and as the heat exchange medium gains in thermal energy it flows upwardly to the fluid storage tank for storage therein and flows back to the exchanger tank as it loses thermal energy. The fluid storage tank includes the heat exchange means in communication with the second heat exchanger for transmittal of thermal energy to the structure.

In addition to the foregoing, thermal energy is also radiated from the exchange medium to the earth through the walls of the containers and the envelope surrounding the containers. Earth stored thermal energy serves to heat the heat exchange medium in the containers at such a time as the temperature of the heat exchange medium falls below that of the earth and thus, excess thermal energy is available for heating purposes at such times as when the input of thermal energy from the first heat exchanger is insufficient to supply the demand for heat at the second heat exchanger.

In the cooling mode, the position of the fluid storage tank and the exchanger tank is reversed and the fluid storage tank is disposed in a horizontal plane below that of the exchanger tank. Operation of the system is the reverse of that described above, and the heat exchange medium containing the least amount of thermal energy is contained in the lower fluid storage tank. Thermal energy is removed from the earth during periods that the temperature of the heat exchange medium falls below that of the surrounding earth and the earth subsequently functions as a cool storage area for the heat exchange medium in the containers.

The system of this invention, with its high storage capacity, can be operated during periods when the demand for thermal energy is low to store excess quantities of thermal energy for use during peak periods. Likewise, in the cooling mode, the system can be operated during non-demand periods to remove thermal energy from the earth to create a cool zone around the containers which functions to receive thermal energy from the heat exchange medium during the peak cooling periods.

These and other advantages of the present invention will be apparent from the following detailed description taken in connection with the drawings.

BRIEF DESCRIPTION OF THE DRAWINGS

FIG. 1 is a partially diagramatic partially isometric view showing a complete heating system incorporating the thermal energy storage system operating on the principles of the present invention;

FIG. 2 is an enlarged front elevation of the heat storage system illustrated in FIG. 1;

FIG. 3 is a sectional view taken through line 3—3 of FIG. 2;

FIG. 4 is a sectional view, partially broken away for compactness of illustration, taken through line 4—4 of FIG. 3;

FIG. 5 is a sectional view, taken through line 5—5 of FIG. 3;

DETAILED DESCRIPTION OF THE INVENTION

Figure 6:
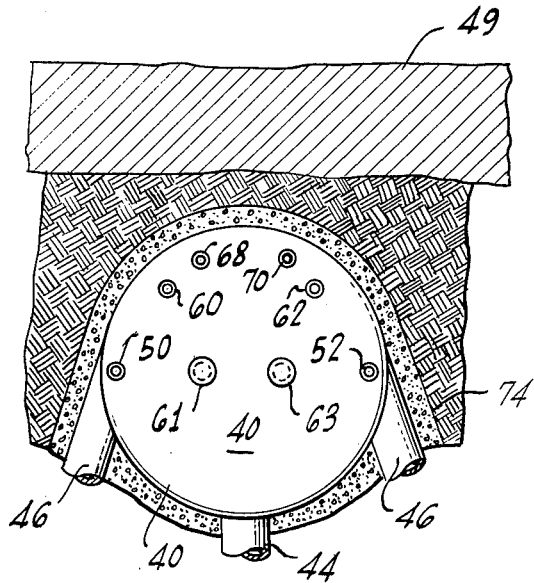
FIG. 6 is an enlarged front elevation with portions in section and portions broken away for compactness of illustration, illustrating a hot fluid storage tank disposed in the earth and having an envelope of non-coherent material thereabout.

As illustrated in FIGS. 1–7, the invention is embodied in a heating system wherein the heat source is solar derived. As is more specifically shown in FIG. 1, a structure 10 is provided with a roof top heat exchange panel 12 suitably located for exposure to the rays of the sun. The heat exchange panel 12 comprises heat exchange coils 14 which are formed of a suitable heat conductive material for transmitting solar energy to heat exchange fluid contained therein. The heat exchange coils 14 are preferably utilized in conjunction with solar collectors, not shown, of conventional design for focusing the rays of the sun on the coils. The specific arrangement and design of solar collectors and of the heat exchange coils 14 for the heating of fluids therein does not form a part of the present invention.

Heated fluid is led by line 16 to an underground heat storage system shown generally at 18, and cooled heat exchange fluid is led back to the heat exchange panel 12 through line 20 for reheating. A pump 22 in the line 20 provides the necessary pumping action for the circulation of the heat exchange fluid between the heat exchange panel 12 and the heat storage system 18.

A line 24 leads from the heat storage system 18 to a conventional heat exchanger, such as a heat pump, illustrated schematically at 26, for circulating heat exchange fluid from the storage system to the heat pump for the removal of heat therefrom and for the distribution of the heat within the structure 10.

A line 28 provides return circulation to the heat exchange system 18 and suitable pumping means, not shown, may be provided for the circulation of the heat exchange fluid as described. Similarly, a line 30 leads water, which has been heated in the heat storage system 18, to a hot water storage tank 32 for domestic use or other use within the structure and a line 34 returns cool water from the tank to the heat storage system for reheating.

An essential feature of such a system is an efficient means for storing solar energy to insure a source of energy during periods when solar energy is not available, such as during the night time or on cloudy days. The present invention resides in the improved heat storage system 18 which provides, in a highly efficient manner, for the storage of excess solar energy and for the recovery thereof when needed.

As is shown in FIGS. 1 and 2, in a preferred embodiment of the invention, the heat storage system 18 comprises a pair of exchanger tanks, 36 and 38, which are spaced apart and disposed in substantially the same plane and a hot fluid storage tank 40 disposed in a plane above the exchanger tanks. The exchanger tanks 36 and 38 are in fluid communication with each other by means of lateral conduits 42 and are in communication with the hot fluid storage tank 40 by means of downcomers 44 which communicate between the lateral conduits and the hot fluid storage tank, and by means of risers 46 communicating between each of the tanks 36 and 38 and the hot fluid storage tank 40. The heat storage system 18 is preferably disposed in an underground location adjacent the structure 10 so that energy stored in the hot fluid tank 40 and the exchanger tanks 36 and 38 is conducted through the walls of the tanks and retained in the surrounding earth for retrieval when the temperature of the tank falls below that of the surrounding earth. In this manner the storage capacity of the system 18 is substantially increased.

The dimensions of the tanks 36, 38 and 40 can be varied depending upon well understood determinants such as for example the type of structure, the heating load, the type of heat exchange, and the like. The embodiment illustrated in FIGS. 1 and 2 is designed for heating a single family residence in a severe winter climate and the tanks 36, 38 and 40 have a diameter of 36 inches and a length of 20 feet so as to provide a maximum heat exchange medium capacity of about 424 cubic feet.

The system 18 is disposed in the earth below the frost line and preferably at a point where the ambient temperature of the earth remains substantially constant. The exact depth of the system 18 is not critical and will vary depending upon the local climatic conditions. It has been found that a depth of on the order of 10 feet below the surface is adequate for most conditions encountered in the United States. An envelope 48 of particulate, non-coherent, non-corrosive material is disposed about the heat storage system 18, and between the tanks 36, 38 and 40, so as to provide a barrier between the heat storage system and the surrounding earth. Preferably the envelope 48 has an apparent coefficient of thermal conductivity (k) in BTU/(hr) (ft2) (LF) of at least that of the surrounding earth so as to not interfere with the energy transfer between the heat storage system 18 and the earth. For the embodiment described herein, good results are achieved when the thickness of the envelope 48 between the heat storage system 18 and the earth ranges between about 8 to about 24 inches. The thickness of the envelope 18, however, may be varied depending upon soil conditions, the climatic conditions and the dimensions of the storage system 18.

Under normal operating conditions, it has been found that a zone of heated earth will extend from the system 18 about 65 feet. Accordingly, it is preferred practice to provide a substantially horizontal layer of insulating material 49, overlying the heat storage system 18 to prevent heat loss to the surface.

As mentioned, the material forming the envelope 18 is non-corrosive to the system 18, is non-coherent, and has a k not less than that of the surrounding earth. Good results are achieved using finely crushed quartz as the material of the envelope 48. Quartz is substantially neutral (pH 6–8) and is therefore substantially non-corrosive to conventional material utilized in the heat storage system 18. In addition, crushed quartz has a $k$ of between 12 and about 16 depending on its dry density as compared to earth ($k$ between about 4 and 10 depending on the composition and density.) Thus, quartz functions efficiently in the storage and retrieval of energy between the system 18 and the surrounding earth. Moreover, crushed quartz itself has a substantially high heat storage capacity, on the order of 2200 BTU/ft$^3$, and thus acts as an additional storing medium for energy. It is preferred that the particle size of the quartz range between about 0.5 mm to about 2.0 mm.

As is more specifically shown in FIGS. 2, 3, 4 and 5, openings 50 and 52 are provided in the end wall of the hot fluid storage tank 40 for the extension therethrough of inlet lines 20 and 16 respectively for the circulation of heat exchange fluid between the storage system 18 and the solar panel 12. The line 16, which carries the heat exchange fluid from the solar panel 12, extends through a portion of the interior of the tank 40, downwardly through the riser 46 and leads into a series of heat exchange coils 56 (FIG. 5) disposed in the lower portion of the interior of the tank 38. A corresponding series of heat exchange coils 54 are similarly disposed in the tank 36 and communicate with the heat exchange coils 56 by a lateral line 58 extending between the coils 54 and 56 through the lateral conduit 42. The outlet line 20, which conducts heat exchange fluid back to the solar panel 12, leads from the heat exchange coil 54 through the riser 46 back to the hot fluid storage tank 40 and exits therefrom through the opening 50.

Openings 60 and 62 are provided in the end wall of the hot fluid storage tank 40 for the extension therethrough of the lines 24 and 28 respectively for the circulation of heat exchange fluid between the heat storage system 18 and the heat pump 26. In the embodiment of the invention illustrated, the heat exchange fluid is withdrawn directly from the hot fluid storage tank 40 for circulation to the heat pump 26 and returned to the tank 40 for reheating. As an aid to the proper flow of heat exchange fluid, the return line 28 terminates in a downwardly turned portion 64 within the tank 40 for directing the returned cooled heat exchange fluid toward the downcomers 44. It should be clear, however, that in place of direct use of heat exchange fluid, the lines 24 and 28 can communicate with a heat exchange coil, not shown, for the transfer of energy from the heat exchange fluid within the tank 40 to a heat exchange fluid within the heat exchange coil if direct use of fluid from the tank 40 is not desired.

Hot water for domestic purposes is heated in the hot fluid storage tank 40 by means of a heat exchange coil 66 located in the upper portion of the hot fluid storage tank 40 to which the lines 30 and 34 are connected for the circulation therethrough of domestic water. The lines 30 and 34 extend through openings 68 and 70, respectively, which are provided in the end wall of the hot fluid storage tank 40.

The hot fluid storage tank 40 is vented to the surface at 72 for the relief of pressure caused by the expansion and contraction of the heat exchange fluid contained in the heat storage system 18. However, if higher energy storage capacity is desired, the storage system 18 may be pressurized by the incorporation of an expansion tank and pressure relief valve, not shown, as is conventional in the art.

The heat exchange and storage fluids utilized in the present invention are conventional and are selected and utilized in accordance with standard practice well known to those skilled in the art of heat transfer processes. For example, water is a useful heat exchange fluid for use in the present invention and has the heat storage capacity and coefficient of thermal conductivity to operate efficiently as the heat storage and exchange medium in the system 18. In addition, water is readily available at low cost. Other heat exchange fluids, however, may be utilized such as, for example, the high level heat transfer liquids such as the phenolic ethers, silicone fluids, chlorinated diphenyls and terphenyls, petroleum oils and the like. Such high level heat exchange liquids may be selected because of their higher energy transfer factors and because of their inertness and stability at high temperatures which will result in lower maintenance costs even though their initial expense may be higher.

In accordance with the present invention the heat storage system 18 is so designed as to provide the maximum exchange of thermal energy thereby increasing the efficiency of the system. In accordance with well known thermodynamic principles, the transfer of thermal energy is directly related to the temperature differential between the medium losing thermal energy and the medium gaining thermal energy. Thus, the greater the temperature differential, the greater the rate of exchange of thermal energy. As described, the coolest heat exchange fluid is located in the exchange tanks 36 and 38. Likewise the heat exchange coils 54 and 56 are also located in the lower portions of the exchange tanks 36 and 38 so that the greatest temperature differential is maintained between the heat exchange fluid in the coils 54 and 56 and the heat exchange fluid in the exchange tanks 36 and 38 so as to promote an efficient rate of transfer of thermal energy through the coils to the heat exchange fluid in the exchange tanks.

For the same reasons, the system 18 is so designed that the heat exchange medium containing the greatest amount of thermal energy is maintained in the upper, hot fluid storage tank 40. Accordingly the temperature stratification of the heat exchange fluid within the system 18 is highly desired and mixing of the fluid strata is substantially avoided such as for example, by withdrawing the hot water for the heat pump 36 from the upper portion of the hot fluid storage tank 40 and directing the returning wet cooled water by the downturned portion 64 of the line 28 to the lower portion of the hot fluid storage tank where it enters the downcomers 44 and returns to the exchange tanks 34 and 36 for reheating.

On occasion, such as during extended storm periods or cold periods, demand for heat energy may exceed the rate at which heat energy can be replaced in the hot fluid storage tank 40 from the solar panel 12 or the surrounding earth. For such situations, it is highly desirable to provide auxiliary heating means which are powered or fueled by conventional power or fuel sources.

In accordance with a preferred embodiment of the invention and as is more specifically shown in FIG. 2, openings 61 and 63 are provided in the end wall of the hot fluid storage tank 40 for extension therethrough of auxiliary heating means, not shown. Good results are achieved utilizing electrical resistance heaters which extend through the openings 61 and 63 and are disposed in the upper portion of the hot fluid storage tank 40. The auxiliary heaters operate to heat only that portion of the heat exchange medium in the upper portion of the hot fluid storage tank 40 which is directly involved in the transfer of heat energy to the heat pump 20 and not the entire mass of heat exchange medium. In this manner, auxiliary heat energy is available for immediate or substantially immediate transfer and only that portion of the heat exchange medium involved in heat transfer for use receives heat energy. This results in a substantial savings in fuel expenditure and cost incurred when auxiliary heating means is required.

For the purposes of describing the operation of heat storage system 18, it will be assumed that water is the heat exchange and heat storage fluid. It should be clear, however, that the composition of the heat exchange and storage fluids is not critical and, as described above, other fluids can be employed.

In operation the tanks 36, 38 and 40 are filled with water as the heat storage fluid and heat exchange fluid is circulated through the coils 14 of the solar panel 12 for heating by the sun. The heated fluid is returned through line 16 to the heat exchange coils 54 and 56 located in the lower portions of the exchange tanks 36 and 38. Heat energy from the heat exchange fluid is transmitted to the water contained in the tanks 36 and 38, raising the temperature thereof and lowering the density so that the heated water rises in the tanks 36 and 38 through the risers 46 to the hot fluid storage tank 40. Circulation of heat exchange fluid between the solar panel 12 and the heat exchange coils 54 and 56 is continued as long as the temperature of the solar panel 12 is higher than the temperature of the heat storage fluid in the tanks 36 and 38 and until the desired service temperature in the hot fluid storage tank 40 is reached. Suitable temperature sensing devices are provided for sensing the temperature in the hot fluid storage tank 40 and for activating the pump 22 in a conventional manner for the circulation of heat exchange fluid between the solar panel 12 and the heat storage system 18. Such sensing devices and the necessary circuitry to properly operate them is conventional in the art and does not form a part of the present invention. For average domestic purposes, a service temperature of on the order of 180° F has been found satisfactory.

Heat energy available in the hot fluid storage tank 40 is recovered for use by circulation of the heat storage fluid from the tank 40 through the heat pump 26. The fluid returning from the heat pump enters the tank 40 and, being cooled by removal of a portion of the heat energy at the heat pump, has a greater density than the fluid at service temperature. The cooled returned fluid circulates through the downcomers 44 and lateral conduits 42 to the exchange tanks 36 and 38 for reheating.

Domestic hot water is heated by the conductance of heat energy through the heat energy coil 66 in the tank 40. The fluid surrounding the heat exchange coil 66, having a portion of its heat energy removed, will also seek its temperature stratum and will eventually return to the exchange tanks 36 and 38 for reheating.

As mentioned, the energy storing capacity of the heat storing system 18 is greatly increased by utilizing the surrounding earth as a heat storage medium. As would be expected, a portion of the heat energy of the heat storage fluid in the exchange tanks 36, 38 and particularly tank 40 will be conducted through the walls of the tanks to the surrounding earth. This heat energy is stored in the surrounding earth and defines a zone radiating outwardly from the heat storage system 18 having a temperature gradient which decreases as the distance from the heat storage system increases. As previously mentioned, this gradient may extend during conventional domestic use a distance of on the order of 65 feet from the heat storing system 18. This feature is taken advantage of to store excess heat energy during periods of low heat energy demand to store a substantial quantity of heat energy. The earth, having a substantially low $k$ coefficient, is an efficient storage medium. During periods where heat energy withdrawal from the heat storage system 18 exceeds replacement by solar heating, the fluid temperature in the tanks 36, 38 and 40 will fall below the temperature of the surrounding earth and heat energy will flow from the earth through the walls of the tanks to raise the temperature of the fluid stored therein. As the tanks 36, 38 and 40 are normally disposed a relatively short distance beneath the surface as compared to the distance of the heat zone radiating from the heat storage system 18, the heat insulating barrier 49 is disposed between the earth's surface and the tanks to prevent heat loss at the earth's surface.

The quartz sand envelope 48 functions as a heat storage medium and as a barrier between the earth and tanks 36, 38 and 40 to prevent corrosive attack on the tanks by the surrounding earth. In addition, the envelope 18, being of a non-coherent nature as previously described, aids in avoiding the formation of air films between the walls of the tank and the earth.

Figure 7:
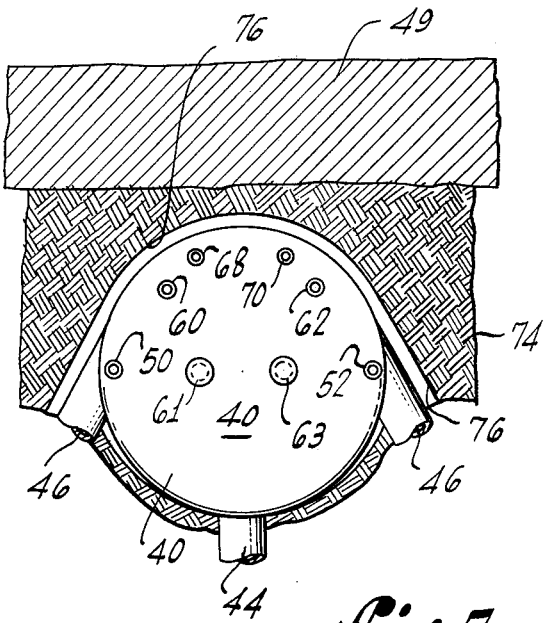
FIG. 7 is a view similar to FIG. 6 illustrating the effect of not having a surrounding envelope of non-coherent material.

As is more specifically shown in FIG. 7, the storage of heat energy in the tank 40 will cause it to expand resulting in the compression of a layer 74 of the earth surrounding the tank wall. Should the temperature within the tank 40 fall below the maximum temperature, the tank wall will contract while the layer 74 of earth, due to its coherent nature, will not expand at the same rate. As a result an air film 76 would be formed between the wall of the tank 40 and the earth. The air film would act as an insulative boundary because of the very low $k$ coefficient of air and the quantity of heat energy in BTU/hr which can be transferred between the tank and the earth would be substantially decreased. It should be clear that a similar effect would occur around the walls of the exchange tanks 36 and 38.

As is more specifically shown in FIG. 6, the envelope 48 of quartz sand surrounding the wall of the tank 40 being non-coherent does not take a permanent set when subjected to the radial compression of the tank wall and acts to absorb the compression so that the earth layer 74 is not itself compressed. Accordingly, formation of the air film 76 is avoided. The quartz sand envelope 48 additionally aids in the conduction of heat energy between the wall of the tank 40 and the adjacent earth. For example, where healy clay comprises the surrounding earth, the coefficient of heat transfer in BTU's/hr., sq. ft., ° F is on the order of 27 times greater when the quartz sand envelope 48 is provided about the system 18 than the system about which no envelope is provided. The foregoing ratio assumes a ground temperature of 50° F and a rise in the internal temperature of the system to 180° F. Without the envelope 48, an air film will be formed about the heat storage system 18 due to expansion of the tanks 36, 38 and 40.

While the foregoing description has been concerned with the storage of heat energy, it should be clear that the present invention may also be utilized for cooling. When so used, the flow of heat energy is substantially the reverse of the system as already described.

In general the system is so described in connection with FIG. 1 with heat exchange fluid being pumped between a cold storage area and a heat exchanger suitably located so that heat energy in the heat exchange fluid is lost and the fluid thus cooled. The cooled fluid is returned to the cold storage area where heat energy is adsorbed from cold storage fluid. The cold storage fluid is circulated through a suitable heat pump for cooling a structure of the like and the now warmed fluid returned to the cold storage are for recooling. As is commonly practiced, circulation of heat exchange fluid for cooling purposes is accomplished during periods where high heat loss will be experienced, such as during the hours of darkness and during the winter months.

Figure 8:
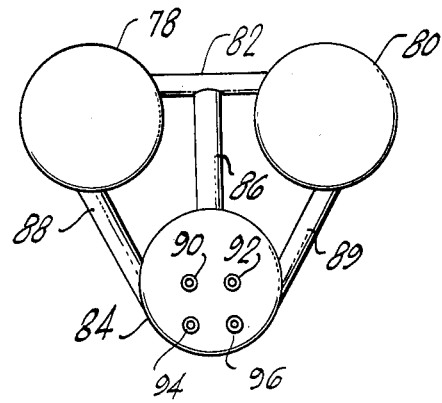
FIG. 8 is a front elevation of a heat storage system incorporating the principles of the present invention and being disposed for cooling purposes.

As is shown more specifically in FIG. 8, a cold storage system, shown generally as 77, operates in conjunction with cooling systems to efficiently cool the heat exchange fluid and to provide a high cooling capacity even during period of high cooling demand, such as during the hot summer months. In the cold storage system 77, which is substantially the inverse configuration of the heat storage system 18, a pair of exchange tanks 78 and 80 are interconnected by a lateral conduit 82 and are in communication with a cold fluid storage tank 84 by means of risers 86 and downcomers 88. A line 90 communicates with a suitable heat exchange or refrigerant system for the cooling of heat exchange fluid and extends through the downcomer 88 to a heat exchange coil, not shown, located in the tank 78. A lateral line, not shown, extends through the lateral conduit 82 to a similar heat exchange coil, not shown, in the tank 80. Line 92 returns through the downcomer 88 extending between the tank 80 and the tank 84 for the return circulation of the heat exchange fluid. As the heat exchange fluid in the tanks 78 and 80 is cooled, it increases in density and flows downwardly through the downcomers 88 to the tank 84. Warmer heat exchange fluid moves upwardly from the tank 84 through the riser 86 and enters the tanks 78 and 80 through the risers 88 and 89 for recooling.

The earth surrounding the tanks 78, 80 and 84 can also serve as a cold storage area in the reverse manner as described for the heat storage system 18 above. That is to say, as the temperature of the heat exchange medium in the tanks 78, 80 and 84 falls below the ambient temperature of the surrounding earth, heat will be extracted from the earth through the walls of the tanks and will be taken up by the heat exchange medium contained therein. Continued circulation between the outside heat exchanger and the tanks 78 and 80 will remove the heat energy absorbed from the earth and during the summer months when cooling is desired, heat absorbed from the structure will be transmitted to the heat exchange fluid and subsequently to the surrounding earth. In this manner, the heat exchange fluid will be continually cooled by the surrounding earth and the heat energy will be gradually dissipated therein or subsequently removed during the following winter in the manner already described. The envelope of crushed quartz, not shown, surrounds the cold storage system 77 and acts to prevent air film formation caused by contraction of tanks 78, 80 and 84 as the fluid contained therein is cooled and as a corrosion barrier between the surrounding earth and the tanks.

Although the foregoing systems have been described in conjunction with a three tank system, it should be clear that other combinations of tanks can be employed to achieve the advantages of the present invention. Thus, for example, a single exchange tank can be utilized in communication with a single hot or cold fluid storage tank and by the same token, more than two exchange tanks can be employed with one or more hot fluid storage tanks. While the invention has been described herewith with reference to certain preferred embodiments thereof, it is to be understood that it may be otherwise embodied within the scope of the appended claims.

I claim:
1. A heat storage system comprising:
a cylindrically shaped hot fluid storage tank;
a pair of cylindrically shaped exchange tanks, said exchange tanks and said hot fluid storage tank being disposed in the earth in spaced apart relationship, said exchange tanks being disposed on the same horizontal plane which is located below the horizontal plane of said hot fluid storage tank;
at least one lateral conduit extending between said exchange tanks for fluid communication therebetween and a vertically disposed downcomer communicating between said lateral conduit and said hot fluid storage tank;
at least one riser extending between each of said exchange tanks and said hot fluid storage tank for fluid communication therebetween;
a heat exchange coil disposed in each of said exchange tanks for fluid communication with a solar heat exchanger for the fluid transfer of heat energy from said solar heat exchanger to said heat exchange coils;
a heat exchange medium contained in each of said tanks for receiving heat energy from said solar heater and for storing said heat energy in said hot fluid storage tank;
means communicating with said hot fluid storage tank for fluid circulation between a second heat exchanger and said hot fluid storage tank for the transfer of heat energy therefrom to said second heat exchanger; and
an envelope of non-coherent material surrounding said system to effect a corrosion resistant barrier therebetween and to aid in the transfer of heat energy between at least said hot fluid storage tank and the surrounding earth, thereby to utilize the surrounding earth for the storage of heat.

2. The heat storage system of claim 1 further including a substantially horizontally disposed insulative barrier above said hot fluid storage tank to prevent the loss of heat energy to the surface.

3. The heat storage system of claim 1 further including a domestic water heat exchange coil in said hot fluid storage tank for the exchange of thermal energy from said heat exchange medium to domestic water contained in said heat exchange coil, said heat exchange coil being in fluid communication with a source of domestic water and with a domestic hot water storage tank whereby domestic hot water is circulated from said heat exchanger coil to said hot water storage tank.

4. The heat storage system as defined in claim 1 further including auxiliary heating means disposed in said hot fluid storage tank, said auxiliary heating means so constructed and arranged as to provide thermal energy to only that portion of said heat exchange medium which is adjacent said means for fluid circulation to said second heat exchanger.

5. A system for the storage and retrieval of thermal energy derived from an external source, said system comprising:
- a metal storage container disposed below the surface of the earth;
- a heat transfer tank disposed below the surface of the earth and spaced vertically from said storage container;
- a passageway interconnecting said storage container and said heat transfer tank;
- a heat transfer fluid in said container and said tank, and freely circulating therebetween through said passageway;
- heat exchange means in said tank and coupled with the external source of thermal energy, said heat exchange means functioning to exchange thermal energy with said heat exchange fluid in said tank; and
- an envelope of tightly packed, non-coherent, particulate material surrounding said container, said particulate material being substantially chemically and electrolytically inert with respect to said container and having a coefficient of thermal conductivity at least as great as that of the surrounding earth to enhance the transfer of thermal energy between said container and the surrounding earth.

6. A system as defined in claim 5 in which said non-coherent particulate material is quartz.

7. A system as defined in claim 5 in which said heat transfer tank is spaced vertically below said storage container.

8. A system as defined in claim 5 in which said heat transfer tank is spaced vertically above said storage container.

9. A system as defined in claim 5 including a second heat transfer tank disposed adjacent said first heat transfer tank in generally the same horizontal plane, and passage means interconnecting said second heat transfer tank with said storage container and said first heat transfer tank, whereby said heat transfer fluid can freely circulate between said first and second heat transfer tanks and between said first and second heat transfer tanks and said storage container.

10. A system as defined in claim 9 further including a second heat exchange means disposed in said second heat transfer tank and coupled with said external source of thermal energy, said second heat exchange means functioning to exchange thermal energy with said heat exchange fluid in said second heat exchange tank.

11. A system as defined in claim 10 wherein each of said heat transfer tanks is made of metal and is encased by said non-coherent particulate material to enhance the transfer of thermal energy between said tanks and the surrounding earth.

12. A system as defined in claim 11 wherein said horizontal plane is spaced vertically below said storage container, and including an insulating material disposed above said storage container to insulate said container from the surface of the earth.

13. A system as defined in claim 11 wherein said horizontal plane is spaced vertically above said storage container.

14. A thermal energy storage and retrieval system intended primarily for use in connection with a solar heater, said system comprising:
- a thermal energy storage container;
- a pair of heat exchange tanks, said tanks and said container being disposed below the surface of the earth in spaced apart relationship with said tanks being disposed in generally the same horizontal plane and vertically spaced from the horizontal plane of said container;
- at least one laterally extending conduit interconnecting said tanks for fluid communication therebetween and a vertically extending conduit communicating between said laterally extending conduit and said container;
- at least one riser extending between each of said tanks and said container for fluid communication therebetween;
- a heat exchange coil disposed in each of said tanks and coupled with a solar heat exchanger for the transfer of thermal energy between said solar heat exchanger and said heat exchange coils;
- a heat exchange medium contained in each of said tanks and said container for receiving thermal energy from said solar heater and for storing said thermal energy in said container, said medium freely circulating through said conduits and said risers, and between said tanks and said container in response to temperature differentials in said tanks and said container;
- an envelope of tightly packed, non-coherent material surrounding said tanks and said container to effect a corrosion-resistant barrier therebetween and to aid in the transfer of thermal energy between at least said container and the surrounding earth, thereby to utilize the surrounding earth for the storage and retrieval of thermal energy.

15. A thermal energy storage and retrieval system as defined in claim 14 wherein said heat exchange tanks are spaced vertically below said storage container.

16. A thermal energy storage and retrieval system as defined in claim 15 further including a substantially horizontally disposed insulative barrier above said container to prevent the loss of heat energy to the surface of the earth.

17. A thermal energy storage and retrieval system as defined in claim 15 further including a domestic water heat exchange coil in said container for the exchange of thermal energy from said heat exchange medium to domestic water contained in said domestic heat exchange coil, said domestic heat exchange coil being in fluid communication with a source of domestic water and with a domestic hot water storage tank whereby domestic hot water is circulated from said domestic heat exchange coil to said hot water storage tank.

18. A thermal energy storage and retrieval system as defined in claim 15 further including auxiliary heating means disposed in said container.

* * * * *